US008870465B2

(12) United States Patent
Miyamoto

(10) Patent No.: US 8,870,465 B2
(45) Date of Patent: Oct. 28, 2014

(54) THRUST BEARING

(75) Inventor: Masato Miyamoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/700,344

(22) PCT Filed: Jan. 26, 2012

(86) PCT No.: PCT/JP2012/051698
§ 371 (c)(1),
(2), (4) Date: Nov. 27, 2012

(87) PCT Pub. No.: WO2013/031249
PCT Pub. Date: Mar. 7, 2013

(65) Prior Publication Data
US 2013/0114921 A1    May 9, 2013

(30) Foreign Application Priority Data
Aug. 29, 2011 (JP) ................. 2011-186369

(51) Int. Cl.
F16C 33/46 (2006.01)
F16C 33/38 (2006.01)
F16C 33/44 (2006.01)
F16C 19/10 (2006.01)

(52) U.S. Cl.
CPC ............ *F16C 33/3887* (2013.01); *F16C 33/44* (2013.01); *F16C 33/3856* (2013.01); *F16C 19/10* (2013.01); *F16C 2240/46* (2013.01)
USPC ........................................ 384/614

(58) Field of Classification Search
CPC ... F16C 33/38; F16C 33/3887; F16C 33/3806
USPC ........... 384/614, 623, 51, 523, 527, 572, 530, 384/576, 528
See application file for complete search history.

(56) References Cited

FOREIGN PATENT DOCUMENTS

| JP | 20014003 A | 1/2001 | |
|---|---|---|---|
| JP | 2003194183 A | 7/2003 | |
| JP | 2004340290 A | 12/2004 | |
| JP | 2006307900 A | 11/2006 | |
| JP | 2007170465 A | 7/2007 | |
| JP | 2008215566 A * | 9/2008 | ............. F16C 19/10 |
| JP | 200997645 A | 5/2009 | |
| JP | 2011117495 A | 6/2011 | |

OTHER PUBLICATIONS

Machine translation of JP 2008-215566, date: N/A.*
Machine Translation of JP 2009-097645, date: N/A.*
Machine Translation of JP 2011-117495, date: N/A.*
Machine Translation of JP 2004-340290, date: N/A.*
International Search Report dated Apr. 17, 2012 from the International Searching Authority in counterpart application No. PCT/JP2012/051698.
Written Opinion dated Apr. 17, 2012 from the International Searching Authority in counterpart application No. PCT/JP2012/051698.

* cited by examiner

*Primary Examiner* — Marcus Charles
*Assistant Examiner* — Yamilka Pinero Medina
(74) *Attorney, Agent, or Firm* — Sughrue Mion, PLLC

(57) ABSTRACT

According to the present invention, there is provided a thrust bearing that includes a first race ring having a first race surface, a second race ring having a second race surface, a plurality of balls that is placed between the first race surface and the second race surface in a rollable manner, and a holder that holds the balls at equal intervals in a circumferential direction, wherein the holder is made of a synthetic resin, and a pocket interval is 2 to 5% of a diameter of the balls. Damage to the holder is prevented and the thrust bearing has a long life.

15 Claims, 5 Drawing Sheets

THRUST BEARING

TECHNICAL FIELD

The present invention relates to a thrust bearing that is used in hydraulic continuously variable transmissions, hydraulic pumps, hydraulic motors and the like.

BACKGROUND ART

In hydraulic continuously variable transmissions, hydraulic pumps, hydraulic motors and the like, a thrust bearing is incorporated as a bearing. For example, in agricultural machines such as combine harvesters tractors, rice planting machines, and lawn mowers, there is a transition from a gear mission type to the hydraulic continuously variable transmission. In such a hydraulic continuously variable transmission, a thrust bearing is adopted in a portion that receives the pressure of the piston, when converting rotational power of a shaft into hydraulic pressure, or when converting hydraulic pressure into the rotational power of the shaft (for example, see Patent Document 1).

RELATED ART REFERENCE

Patent Reference

Patent Document 1: JP-A-2003-194183

SUMMARY OF THE INVENTION

Problems to be Solved by the Invention

In the thrust bearing, although a holder made of iron has been widely used, when an eccentric load such as a thrust bearing for a hydraulic continuously variable transmission has been applied, there has been some cases that an impact has been applied to a pocket surface due to a delay and advance of a ball, and the holder is damaged.

The present invention has been made under such circumstances, and an object thereof is to provide a thrust bearing that prevents the damage to a holder and has a long life.

Means for Solving the Problems

In order to achieve the object, the present invention provides a thrust bearing as below.

(1) A thrust bearing that includes a first race ring having a first race surface, a second race ring having a second race surface, a plurality of balls that is placed between the first race surface and the second race surface in a rollable manner, and a holder that holds the balls at equal intervals in a circumferential direction, wherein the holder is made of a synthetic resin, and a pocket interval is 2 to 5% of a diameter of the balls.

(2) In the thrust bearing described in (1), the holder may contain a glass fiber at a ratio of 20 to 40 mass %.

(3) In the thrust bearing described in (2), the glass fiber may have a heteromorphic cross-section.

(4) In the thrust bearing described in any one of (1) to (3), the synthetic resin of the holder may be polyamide.

(5) In the thrust bearing described in any one of (1) to (4), the synthetic resin of the holder may have a number average molecular weight of 13000 to 30000.

(6) In the thrust bearing described in (5), the holder may be formed by injection molding.

Advantage of the Invention

According to the thrust bearing of the present invention, since the holder is made of a synthetic resin, preferably, a synthetic resin containing a glass fiber, and has a specific pocket interval amount, it is possible to effectively absorb an impact to the holder due to a delay and an advance of a ball, and thus a life becomes longer.

MODES FOR CARRYING OUT THE INVENTION

Hereinafter, a thrust bearing of the present invention will be described in detail with reference to an example of a hydraulic continuously variable transmission.

Figure 1:
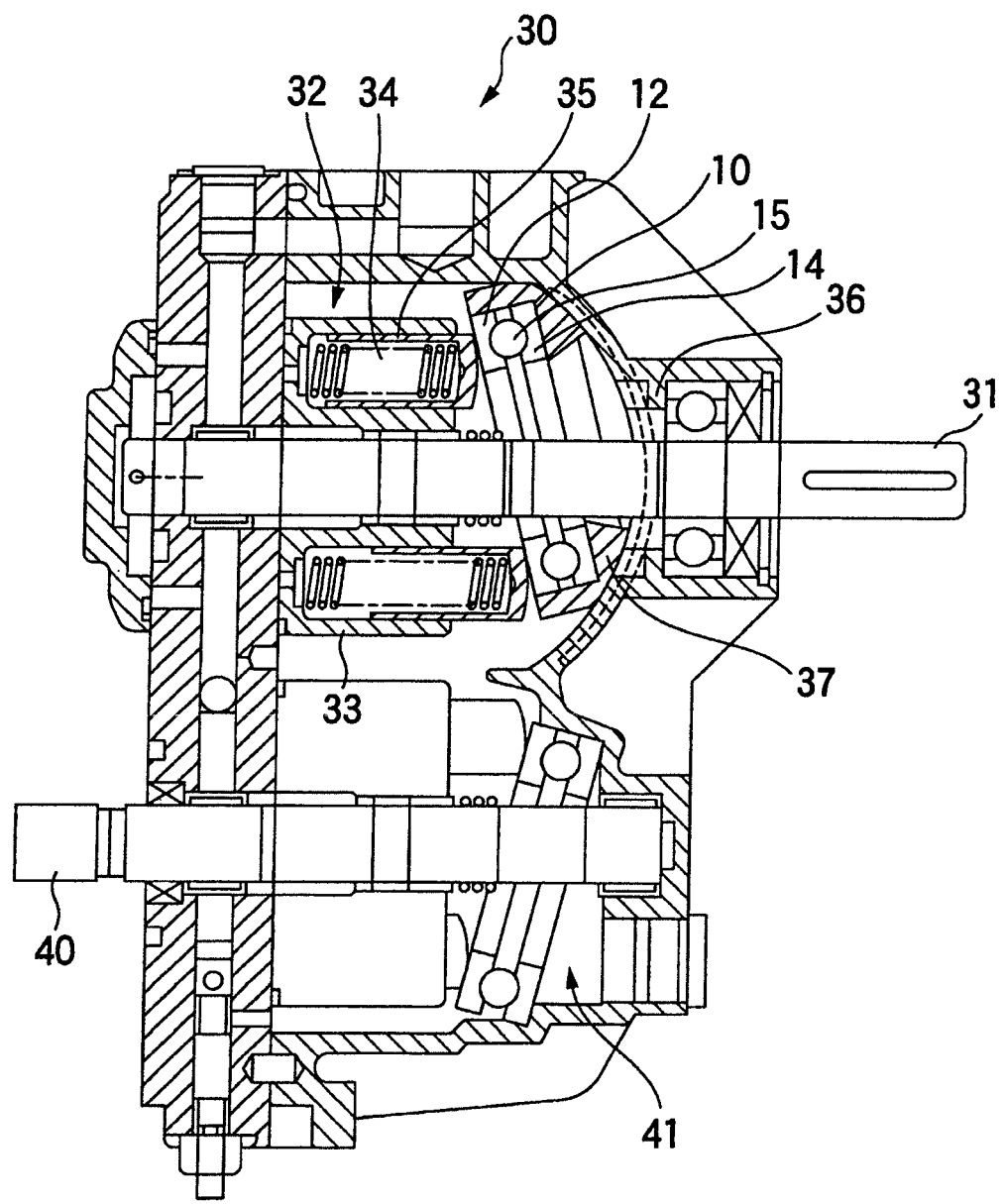
FIG. 1 is a cross-sectional view that illustrates an example of a hydraulic continuously variable transmission.

Although FIG. 1 is a cross-sectional view that illustrates an example of a hydraulic continuously variable transmission, a hydraulic continuously variable transmission 30 includes a variable capacity pump 32 that converts rotational driving force transmitted from an engine not illustrated to an input shaft 31 into hydraulic pressure, and a variable capacity motor 41 that returns the hydraulic pressure to the rotational driving force and transmits the rotational driving force to an output shaft 40, continuously changes the rotational driving force, which is transmitted to the input shaft 31, to driving force of a forward movement side and a backward movement side and outputs the driving force from the output shaft 40, or stops the output thereof.

The variable capacity pump 32 includes a cylinder block 33 that is rotated integrally with the input shaft 31, nose pistons 35 that are placed at plural locations in a circumferential direction of the cylinder block 33 and reciprocate in a piston chamber 34, and a cam plate 37 that is rotated along a guide surface of a guide block 36. The variable capacity pump 32 changes a reciprocation stroke of the nose piston 35 by a rotation operation of the cam plate 37, and changes an oil quantity that is discharged from the piston chamber 34. A thrust bearing 10 is placed in the cam plate 37 at a position of coming into contact with a leading end portion of the nose piston 35, and the thrust bearing 10 is rotated together with the cam plate 37.

Figure 2:
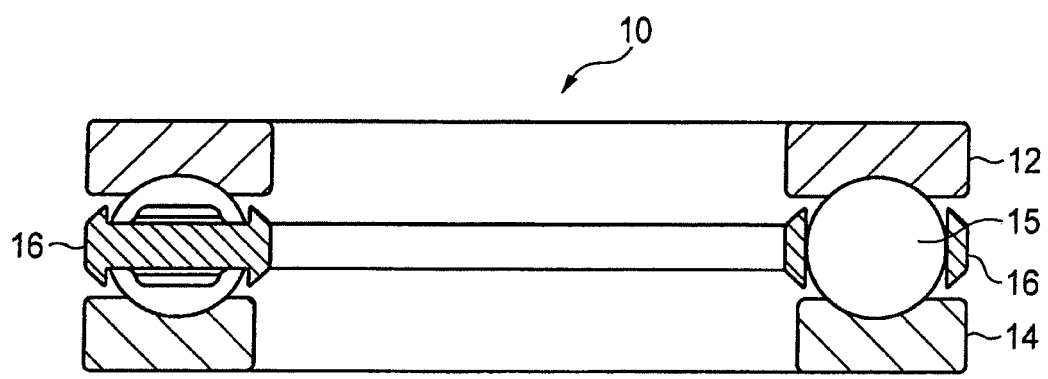
FIG. 2 is a cross-sectional view that illustrates an example of a thrust bearing.

As illustrated in FIG. 2, the thrust bearing 10 includes a first race ring 12 that comes into contact with a leading end portion of the nose piston 35 in the end surface 21 of the outside of the bearing and has a first race surface 11, a second race ring 14 that is fixed to the cam plate 37 and has a second race surface 13, and a plurality of balls 15 that is placed between the first race surface 11 and the second race surface 13 in a freely rollable manner. Furthermore, the thrust bearing 10 includes a holder 16 that holds the plurality of balls 15 at equal intervals in the circumferential direction.

In the present invention, the holder 16 is made of a synthetic resin. Although the synthetic resin is not limited, when considering thermal resistance, fatigue resistance or the like, a polyamide such as an aromatic polyamide, a polyamide 46, or a polyamide 66 are preferably used. An aromatic polyamide has a high melting point and high strength, and can be used at a high temperature of 130 to 150° C. Furthermore, the polyamide 46 also has a thermal resistance of 120 to 140° C., and the resin itself has high impact strength and fatigue resistance. Furthermore, although the polyamide 66 has thermal resistance of 100 to 120° C., the balance of the impact strength, fatigue resistance and the like are favorable, and the material cost is also low.

Furthermore, the holder 16 preferably contains a glass fiber for reinforcement. Although a glass fiber having a circular cross-section can also be used, preferably, the cross-section may be heteromorphic shapes such as an elliptical shape, an oblong shape, or an eyebrow shape. The glass fiber of the heteromorphic cross-section is less likely to fold compared to the glass fiber of the circular cross-section, is kneaded with the resin, and is dispersed in the resin in a more lengthwise state compared to the glass fiber of the circular cross-section at the time of the injection molding. For these reasons, when compared at the same content, the reinforcement effect is higher than the glass fiber of the circular cross-section. In addition, since the glass fiber of the heteromorphic cross-section is oriented to form a surface parallel to a surface of the holder during molding, load can be received by the surface, and load resistance is excellent. Furthermore, slight reinforcement effect is exhibited in a radial direction, and the reinforcement effect is improved. Additionally, since there is a small difference in dimension change, a shrinkage cavity is not likely to occur.

A heteromorphic ratio (a ratio of a long diameter portion to a short diameter portion) of the glass fiber of the heteromorphic cross-section is preferably 1.5 to 5, and more preferably, 2 to 4. When the heteromorphic ratio is less than 1.5, an effect of an improvement of mechanical strength or the like is small, and when the heteromorphic ratio exceeds 5, the glass fiber is too flat, and it is difficult to stably manufacture the glass fiber. Furthermore, the short diameter portion is preferably 5 to 12 μm. If the short diameter portion is less than 5 μm, since the breakdown and damage occur when the glass fiber is manufactured to be excessively thin, it is difficult to secure stable quality at a low cost, and utility is low. Meanwhile, when the short diameter portion exceeds 12 μm, the fiber is too thick in consideration of the heteromorphic ratio, dispersion properties in the resin are degraded, and a strength deviation may occur in the resin portion.

When using the glass fiber of the circular cross-section, since there are a large number of fibers in the same combination quantity, it is preferable to use a thin diameter glass fiber. In a general holder made of a synthetic resin, an average fiber diameter is about 10 to 13 μm, but it is preferable to use an average fiber diameter of 6 to 8 μm.

As the glass fiber mentioned above, it is preferable to use a glass fiber that has been subjected to a surface treatment by a silane coupling agent having epoxy group or an amino group in a piece terminal, or an epoxy-based, urethane-based, acrylic-based sizing agent or the like.

The content of the glass fiber is preferably 20 to 40 mass % of a total amount of the holder, and more preferably, 25 to 35 mass %. If the content of the glass fiber is less than 20 mass %, the reinforcement effect is insufficient. Meanwhile, the fluidity decreases as the content of the glass fiber increases and this not suitable for the injection molding. Furthermore, the higher the content of the glass fiber is, the harder the holder 16 is bent, and it is hard to incorporate the ball 15 when assembling the bearing. When considering these, an upper limit of the content of the glass fiber is preferably 40 mass %, and more preferably, 35 mass %.

Furthermore, it is preferable to adjust a molecular weight of the resin mentioned above to a range that shows fluidity in which the injection molding can be performed in a state of containing a specific amount of glass fiber in consideration of the injection molding. Specifically, the molecular weight is preferably 13000 to 30000 in a number average molecular weight, and furthermore, when considering mechanical strength such as impact strength, the molecular weight is more preferably 18000 to 26000 in the number average molecular weight. If the number average molecular weight is less than 13000, the molecular weight is too low, the mechanical strength is low, and utility is low. On the contrary, if the number average molecular weight exceeds 30000, the melting viscosity of a state of containing the glass fiber by a normal quantity is too high, and it is difficult to more precisely manufacture the fiber glass by the injection molding.

In the resin composition mentioned above, although it is possible to add various additives as necessary, it is possible to add the additives to a general synthetic resin holder.

Furthermore, it is possible to replace a part of the glass fiber with a carbon fiber. As the carbon fiber, for example, a pitch-based or a PAN-based carbon fiber is adopted. In addition, it is also possible to replace a part of the glass fiber with a whisker-shaped reinforcement material such as a potassium titanate whicker and a boroic acid aluminum whisker.

Figure 3:
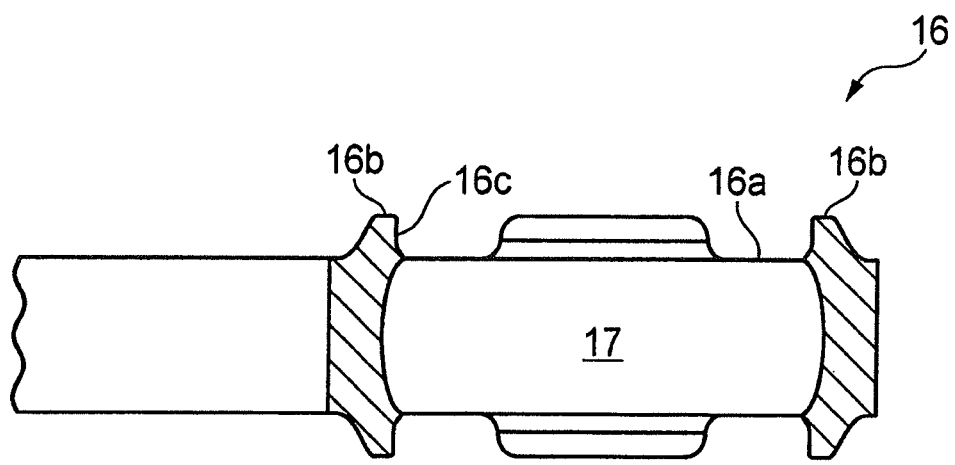
FIG. 3 is a cross-sectional view that illustrates an example of a holder.
Figure 4:
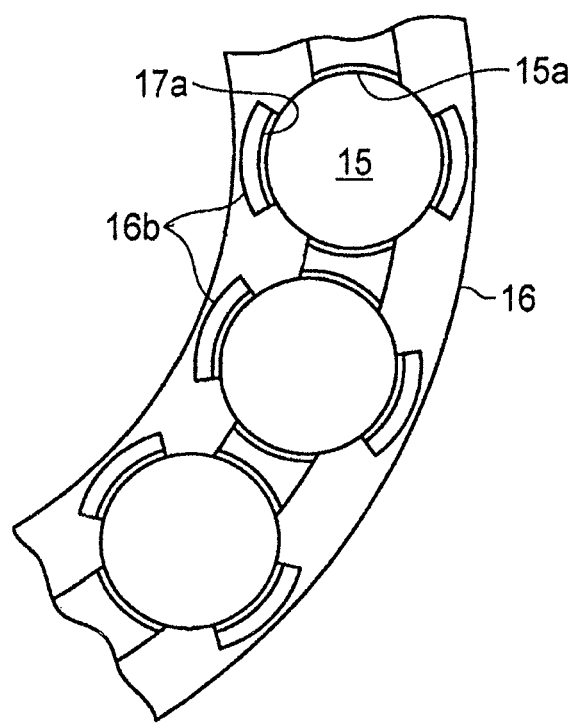
FIG. 4 is a top view of FIG. 2.

Although there is no limit in the shape of the holder 16, for example, shapes illustrated in FIGS. 3 and 4 can be used. Furthermore, FIG. 3 is a cross-sectional view that illustrates a state of removing the ball 15 from FIG. 2, and FIG. 4 is a top view of FIG. 2. As illustrated, in the holder 16, a plurality of pockets 17 is formed in an annular base portion 16a, and claw portions 16b projected outward from the base portion 16a at plural locations (four locations at equal intervals in an example of the drawings) around the pocket 17. Furthermore, a surface 16c of the claw portion 16b of a pocket side is elastically deformed substantially vertically so as to easily insert the ball 15 during assembling.

However, the pocket interval of the holder 16 is set to 2 to 5% of the diameter of the ball 15. That is, as illustrated in FIG. 4, an interval between the surface 15a of the ball 15 and the pocket surface 17a of the pocket 17 is set to 2 to 5% of the diameter of the ball 15. By setting the pocket interval, it is possible to effectively prevent damage to the holder 16. The movement distance of the ball 15 increases as the pocket interval increases, and the impact to the pocket surface 17a is also increased. At the same time, as the interval between the pockets is narrowed, the pillar portion between the pockets becomes thinner, and the strength is lowered. For that reason, an upper limit of the pocket interval to the diameter of the ball 15 is set to 5%, and more preferably, 4%. Furthermore, when setting the pocket interval to be less than 2% of the diameter of the ball 15, a load maximum value to the holder 16 is increased to cause a strength drop, and thus the value is not suitable.

Furthermore, although the thrust ball bearing has been described above as an example in regard to the thrust bearing of the present invention, it is possible to use a roll or a conical roll as the rolling element.

Embodiment

Hereinafter, although the present invention will be described using an example, the present invention is not limited thereby.

(Test 1)

A durability test was performed under a moment load condition that assumes the delay and the advance of the ball using an iron retainer and a holder made of a synthetic resin in which a glass fiber (a sizing agent treatment product, an eyebrow-shaped cross-section) was mixed with the polyamide 66 at 25 mass %. Bearing "6204" manufactured by NSK Ltd. was used as a test bearing, and turbine oil was used as a lubricant. Furthermore, the pocket interval of the holder made of synthetic resin was 3% of the ball diameter. As the test conditions, the number of revolutions was 2000 min$^{-1}$, the moment load was 73.5 N·m, and an atmospheric temperature was 40° C. or 100° C. As a result, compared to a case where the holder made of an iron was damaged within 20 hours, the holder made of a synthetic resin was not damaged even if exceeding 20 hours.

(Test 2)

Figure 5:
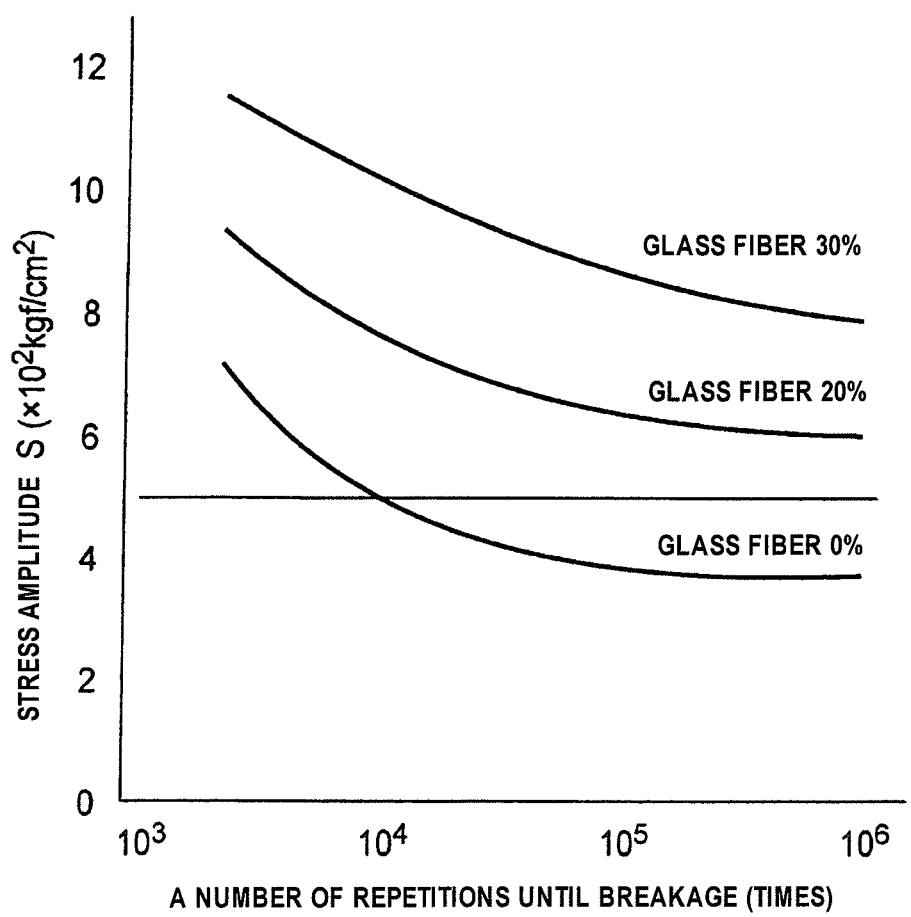
FIG. 5 is a graph that illustrates a result of Test 2.

A test piece was prepared which was formed of the polyamide 66 only, a resin composition in which the same glass fiber was mixed with the polyamide 66 at 20 mass %, and a resin composition in which the same glass fiber was mixed with the polyamide 66 at 30 mass %, and a bending fatigue curve was created based on ASTM D 671. As the measurement atmosphere, the temperature was 23° C., the humidity was 85% RH, and the cycle number was 1800 rpm. The result is illustrated in FIG. 5. Furthermore, a vertical axis S in FIG. 5 is stress amplitude, and a horizontal axis N is a number of repetitions until breakage. As illustrated, although the repeat stress is increased with an increase in the content of the glass fiber, since the stress amplitude is around $5 \times 10^2$ kgf/cm$^2$ in the holder of a general thrust bearing for a hydraulic continuously variable transmission, it is understood that the content of the glass fiber may be 20 mass % or more.

(Test 3)

Figure 6:
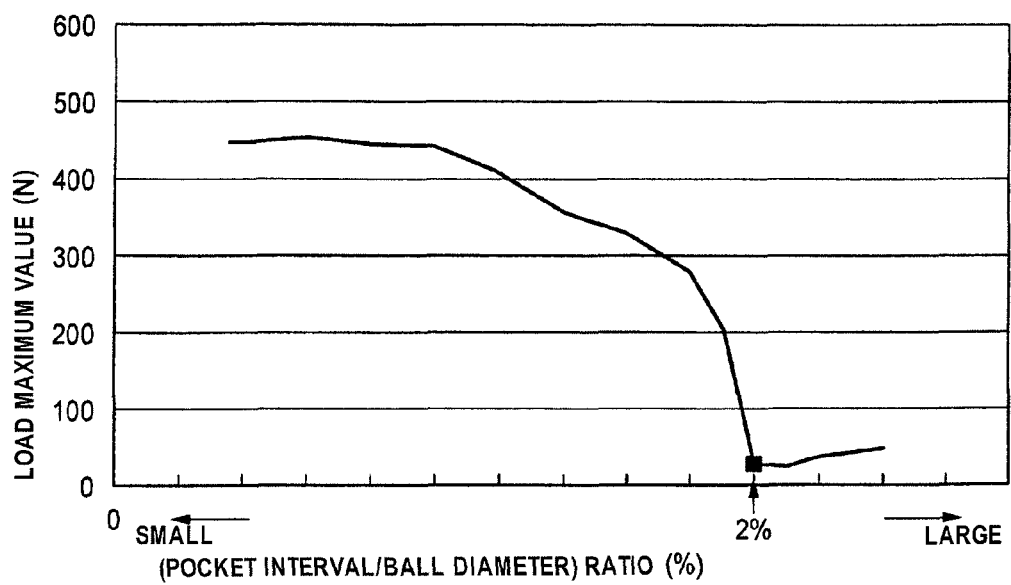
FIG. 6 is a graph that illustrates a result of Test 3.

Plural holders made of a synthetic resin were manufactured in which the same glass fiber was mixed with the polyamide 66 at 30 mass % with different (pocket interval/ball diameter) ratios. Moreover, the load maximum value of the respective holders was measured. The result thereof is illustrated in FIG. 6 and although the load maximum value decreases as the pocket interval increases, the value is a minimum if the (pocket interval/ball diameter) ratio is 2%, and the glass fiber is nearly saturated or slightly rises if the (pocket interval/ball diameter) ratio is greater than 2%. It is understood therefrom that the minimum value of the (pocket interval/ball diameter) ratio may be 2%.

Although the present invention has been described in detail or with reference to a specific embodiment, it is obvious by those skilled in the art that various alternations and modifications can be added without departing from the spirit of the present invention.

The present invention contains subject matter related to Japanese Patent Application No. 2011-186369 filed in the Japanese Patent Office on Aug. 29, 2011, the entire contents of which are incorporated herein by reference.

INDUSTRIAL APPLICABILITY

The thrust bearing of the present invention is applied to hydraulic continuously variable transmissions, hydraulic pumps, hydraulic motors or the like.

DESCRIPTION OF REFERENCE NUMERALS AND SIGNS 10 thrust bearing
12 first race ring
14 second race ring
15 ball
16 holder
16a base portion
16b claw portion
17 pocket
30 hydraulic continuously variable transmission

The invention claimed is:

1. A thrust bearing for a hydraulic continuously variable transmission including:
   a first race ring having a first race surface;
   a second race ring having a second race surface;
   a plurality of balls that is placed between the first race surface and the second race surface in a rollable manner; and
   a holder that holds the balls at equal intervals in a circumferential direction, wherein
   the holder is made of a synthetic resin,
   a pocket interval is 2 to 5% of a diameter of the balls,
   the holder includes:
      a first protruded portion, protruded along the axial direction and disposed between the balls; and
      a second and third protruded portions, protruded along the axial direction and disposed on diametrically opposite sides of each of the balls along a radius of the holder, and
   an interval between the first protruded portion and the ball is 2 to 5% of a diameter of the balls.

2. The thrust bearing according to claim 1, wherein the holder contains a glass fiber at a ratio of 25 to 35 mass %.

3. The thrust bearing according to claim 1, wherein the holder contains a glass fiber at a ratio of 20 to 40 mass %.

4. The thrust bearing according to claim 3, wherein the synthetic resin of the holder is polyamide.

5. The thrust bearing according to claim 3, wherein the synthetic resin of the holder has a number average molecular weight of 13000 to 30000.

6. The thrust bearing according to claim 5, wherein the holder is formed by injection molding.

7. The thrust bearing according to claim 3, wherein the glass fiber has a heteromorphic cross-section.

8. The thrust bearing according to claim 3, wherein the synthetic resin of the holder is polyamide.

9. The thrust bearing according to claim 7, wherein the synthetic resin of the holder has a number average molecular weight of 13000 to 30000.

10. The thrust bearing according to claim 9, wherein the holder is formed by injection molding.

11. The thrust bearing according to claim 1, wherein the synthetic resin of the holder is polyamide.

12. The thrust bearing according to claim 11, wherein the synthetic resin of the holder has a number average molecular weight of 13000 to 30000.

13. The thrust bearing according to claim 12, wherein the holder is formed by injection molding.

14. The thrust bearing according to claim 1, wherein the synthetic resin of the holder has a number average molecular weight of 13000 to 30000.

15. The thrust bearing according to claim 14, wherein the holder is formed by injection molding.

* * * * *